United States Patent [19]
Cadman

[11] Patent Number: 5,365,420
[45] Date of Patent: Nov. 15, 1994

[54] HIGH EFFICIENCY INTRINSICALLY SAFE POWER SUPPLY

[75] Inventor: Gary R. Cadman, Norwell, Mass.

[73] Assignee: Scully Signal Company, Wilmington, Mass.

[21] Appl. No.: 76,812

[22] Filed: Jun. 14, 1993

[51] Int. Cl.⁵ .............................................. H02M 7/10
[52] U.S. Cl. ..................................................... 363/50
[58] Field of Search ................... 363/50; 323/231, 282, 323/284; 361/18, 91

[56] References Cited

U.S. PATENT DOCUMENTS

| | | | |
|---|---|---|---|
| 4,099,216 | 7/1978 | Weberg | 361/91 |
| 4,423,369 | 12/1983 | Alaspa et al. | 323/303 |
| 4,708,022 | 11/1987 | Johnson | 73/861.28 |
| 4,992,723 | 2/1991 | Zylstra et al. | 323/284 |
| 5,136,630 | 8/1992 | Breneman | 379/64 |
| 5,144,517 | 9/1992 | Wieth | 361/55 |

*Primary Examiner*—Steven L. Stephan
*Assistant Examiner*—Matthew Nguyen

[57] ABSTRACT

A dynamically self-calibrating, intrinsically safe DC—DC power supply generates a controlled output voltage during normal operation and limits the output voltage and current during fault conditions, such as applied overvoltages or short circuits within the supply. The supply has a voltage regulator for generating a controlled output voltage in response to a feedback voltage applied to a control terminal. The supply also has a voltage-clamping Zener barrier, which includes (i) a power Zener diode connected between the output and control terminals of the regulator for supplying the feedback voltage thereto, which is reverse-biased during normal operation of the supply, and (ii) a non-linear, low impedance path between the control terminal and ground in parallel with a resistor. The feedback voltage causes substantially constant current to flow through the diode during normal operation, thereby dynamically compensating for any variation in breakdown voltage of that Zener diode. By operating normally with minimal current through the diode, the supply's output power can be optimized without compromising the intrinsically safe operation of the supply.

16 Claims, 2 Drawing Sheets

HIGH EFFICIENCY INTRINSICALLY SAFE POWER SUPPLY

BACKGROUND OF THE INVENTION

A. Field of the Invention

This invention relates generally to an intrinsically safe DC-to-DC power supply having a voltage-clamping Zener diode barrier, which is suitable for use in an overfill protection device. The invention relates more particularly to a novel design for such a power supply that dynamically self-compensates for variations in breakdown voltage of the Zener diode barrier (e.g., due to component tolerances and temperature drift and aging effects) so as to maximize the supply's output power while maintaining a nominal biasing current flowing through the Zener barrier.

B. Description of the Related Art

Tanks used for storing or transporting flammable fluids such as gasoline, diesel fuel and other hazardous petroleum products are often equipped with overfill protection devices to stop the filling operation when the tanks are full, and thereby prevent waste and protect the environment from spillage due to overfilling.

The tanks can be mounted on tanker trucks or located, e.g., underground at service stations. Tanker trucks are typically filled with the fluids using pumping equipment at loading racks of marketing terminals, and underground storage tanks are typically gravity filled from the trucks. An overfill protection device is used with each tank to disable the pumping equipment at the marketing terminal or to close a truck-mounted flow valve at the service station when the limit of the tank's capacity is reached.

The overfill protection device typically has a detection circuit and a disable circuit. The detection circuit has a probe located within the tank which generates a sensor signal that indicates when the fluid within the tank exceeds a pre-determined level. The detection circuit also has a microprocessor-containing controller mounted near the tank that controls the operation of the probe. The detection circuit provides the sensor signal to the disable circuit over a suitable electrical cable. In response to the sensor signal indicating that the tank is full, the disable circuit operates to stop flow into the tank (e.g., depending on where the tank is located, by disabling the pumping equipment at the loading rack or by closing the flow valve on the truck).

The detection circuit also includes a power supply for energizing the probe and the controller. Because the fluids are flammable, the overflow protection device is typically and preferably designed to be "intrinsically safe." As defined in applicable standards promulgated by governmental agencies and industrial organizations, an intrinsically safe circuit cannot produce any spark or thermal effect, either during "normal" or under any likely "fault" condition, which is capable of causing the ignition of a mixture of the flammable fluid and its vapor or other combustible material in air. As a practical matter, this means that the power supplies used in overfill protection devices have special components, e.g., fuses, voltage-clamping Zener-diode barriers, and current-limiting output resistors, that limit the current and voltage delivered to circuitry located within firehazard locations.

More specifically, a conventional intrinsically-safe ("I.S.") power supply for use in an overflow protection device has a conventional voltage regulator for delivering a regulated, substantially constant-magnitude voltage to the detection circuit.

For precision regulation, the conventional voltage regulator often includes a feedback arrangement to maintain the substantially constant output voltage despite variations in the magnitude of the input voltages applied from a power source to the regulator. A voltage divider in the feedback circuit establishes the magnitude of the output voltage. The voltage divider typically includes a variable resistor or potentiometer connected between an output terminal and a control terminal of the voltage regulator, and a second resistor connected between its control terminal and a return path back to the power source, i.e., ground.

The power supply also has specific I.S. components, including a current-limiting output resistor connected between a regulator output terminal and the power supply output terminal to limit the output current, a voltage-clamp that is also connected to the regulator output terminal to limit the output voltage to a safe level, and a fuse.

The voltage-clamp is typically formed as a Zener barrier, which includes at least one power Zener diode connected between the regulator output terminal and ground. For intrinsically-safe power supply operation, each Zener diode typically has a second Zener diode in parallel with it for redundancy in case of component failure.

The fuse is connected in the voltage input circuit for the regulator to limit the maximum current drawn by the power supply. By limiting that current, the fuse also limits the maximum power dissipation in the other I.S. components, i.e., the output resistor and the voltage clamp.

These I.S. components insure intrinsically safe operation of the power supply even during "fault" conditions. Such fault conditions for which the circuit is designed, include an overvoltage on the input terminal of the regulator, in response to which the Zener barrier limits the supply's output voltage to below a preselected limit by shunting excessive current due to the overvoltage to ground. Another possible fault condition is a short circuit across the supply's output, in response to which the Zener barrier limits the resulting voltage, and, together with the output resistor, limits the resulting current.

While such conventional I.S. power supplies are generally suitable for their intended applications, they do have drawbacks. For precision voltage regulation in overfill protection devices, the power supplies are typically individually factory calibrated (e.g., by adjusting the potentiometer of the voltage divider) before shipment to compensate for variances in component tolerances particularly in the breakdown voltages of the Zener diodes of the voltage clamp. Because the power supplies are expected to operate for years outdoors over wide variations in ambient temperature, the factory calibration also is intended to compensate for anticipated temperature-dependent and aging effects on the breakdown voltages of those Zener diodes.

Factory calibration requires an additional time-consuming step during post-assembly testing of the circuit. Moreover, the factory calibration requires that compromises be made in the current operating point of the Zener diodes of the voltage clamp. To prevent the Zener diodes from conducting excessive current in normal operation due to changes in the Zener breakdown voltage, the regulator output voltage is typically set during calibration to a lower than optimal level. Accordingly, conventional I.S. power supplies achieve less than optimal efficiency in terms of the magnitude of the output power from the power supply for a given power input.

It would be desirable to provide an intrinsically safe power supply that does not require such calibration adjustments, and that operates more efficiently than the prior art circuit.

DESCRIPTION OF THE INVENTION

A. Summary of the Invention

The present invention resides in an improved intrinsically safe power supply of the type described above, except with a voltage-clamping Zener barrier of novel configuration connected into the feedback loop of the supply's voltage regulator. The Zener barrier is connected between the output of the voltage regulator and ground, and provides the feedback signal to the voltage regulator. This novel arrangement of the Zener barrier causes the voltage regulator to dynamically compensate for any variation in the breakdown voltages of the Zener diodes comprising the Zener barrier.

The Zener barrier provided by the invention includes (a) one or more reverse-biased power Zener diodes connected between the voltage regulator output and its control terminals, and (b) a non-linear, low impedance path between the control terminal and ground provided, e.g., by one or more forward-biased power Zener diodes. This arrangement automatically offsets any variations in Zener breakdown voltage by changing the regulator output voltage in such a way as to maintain substantially constant current flowing through the reverse-biased Zener diodes during "normal" operation of the supply. The magnitude of the normally constant Zener current, i.e., the current operating point, is established by the magnitude of the reference voltage at the regulator reference terminal, and the value of a resistor connected between the regulator's control terminal and ground.

Accordingly, the invention eliminates the need for factory calibration of the power supply, as described above. Consequently, the invention eliminates the need for the potentiometer that the prior art uses in the output-voltage controlling voltage divider, and, in fact, substitutes the reverse-biased Zener diodes for that potentiometer in the voltage divider.

By "minimizing" current through the Zener barrier, the output power from the power supply can be maximized, and needless dissipation of power in the Zener barrier eliminated. The Zener barrier current is minimized by appropriately setting the magnitude of the current through the reverse-biased Zener diodes to the "knee" in their I-V curve, i.e., at the point of the curve where reverse current begins to flow at a substantially non-linear rate with respect to increases in reverse voltage. Under fault conditions, however, the Zener barrier of the power supply provided by the invention will still provide the requisite intrinsically safe operation by limiting the output voltage to below a safe limit.

The non-linear nature of the low-impedance path to ground in the Zener barrier assures that the voltage drop across that path will not vary significantly even during fault conditions. The non-linear path exhibits a minimal voltage change thereacross for each doubling of the current therethrough during normal operation of the circuit. For example, with forward-biased Zener diodes of a known type forming that path, the voltage drop thereacross will rise only eighteen millivolts during each doubling of current through those diodes, e.g., from 0.1 to 0.2 amps. or from 0.2 to 0.4 amps.

Advantageously, Zener diodes, whether forward or reverse biased, will fail in a shorted condition in response to an excess current, i.e., a current beyond the maximum rated current for the devices, thus limiting the output voltage of the power supply.

Accordingly, the invention provides an intrinsically safe power supply that is more efficient than known prior art circuits.

B. Brief Description of the Drawing

For a fuller understanding of the nature of the invention, reference should be had to the following detailed description taken in connection with the accompanying drawings, in which.

Figure 1:
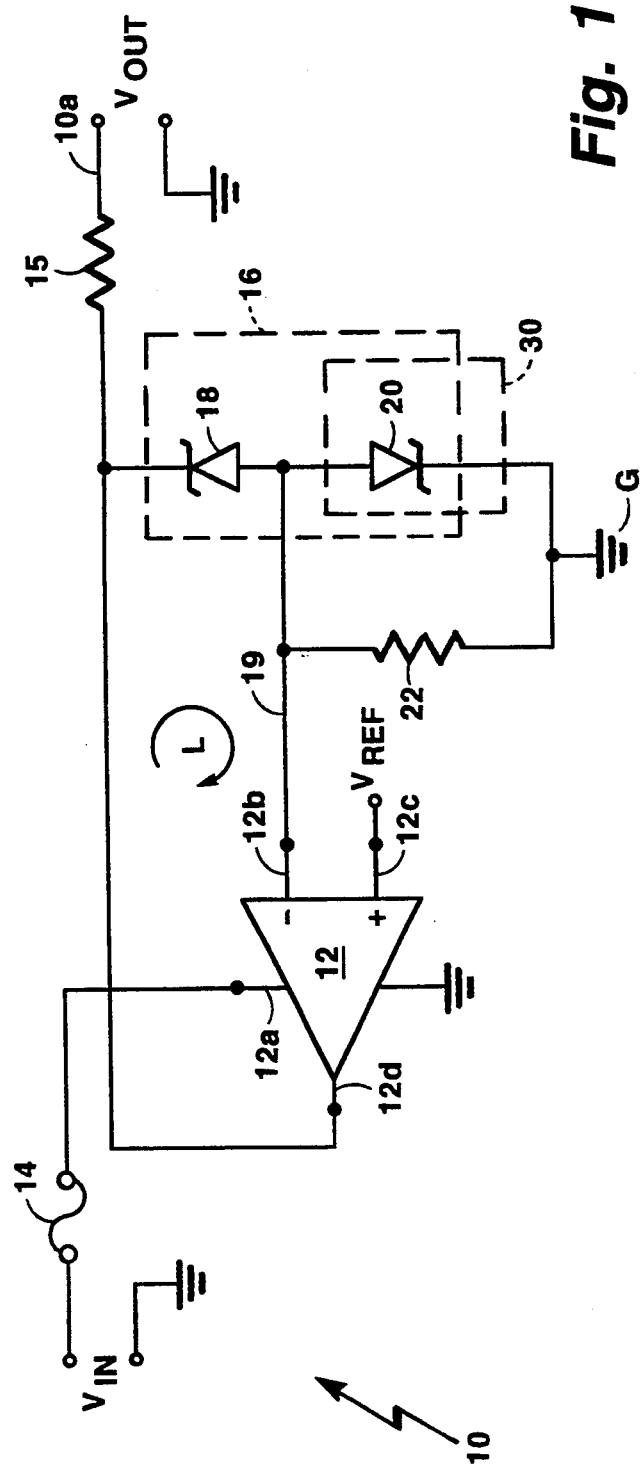
FIG. 1 is a schematic view, partially in block diagram form, of an intrinsically safe power supply in accordance with an illustrative embodiment of the invention.
Figure 3:
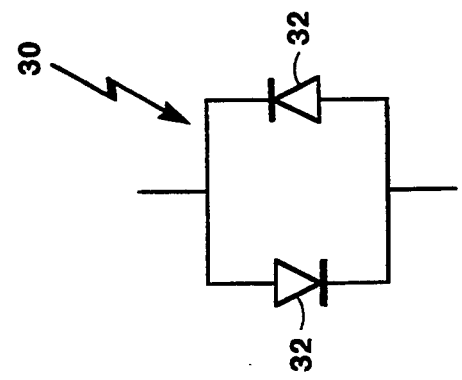
Figure 4:
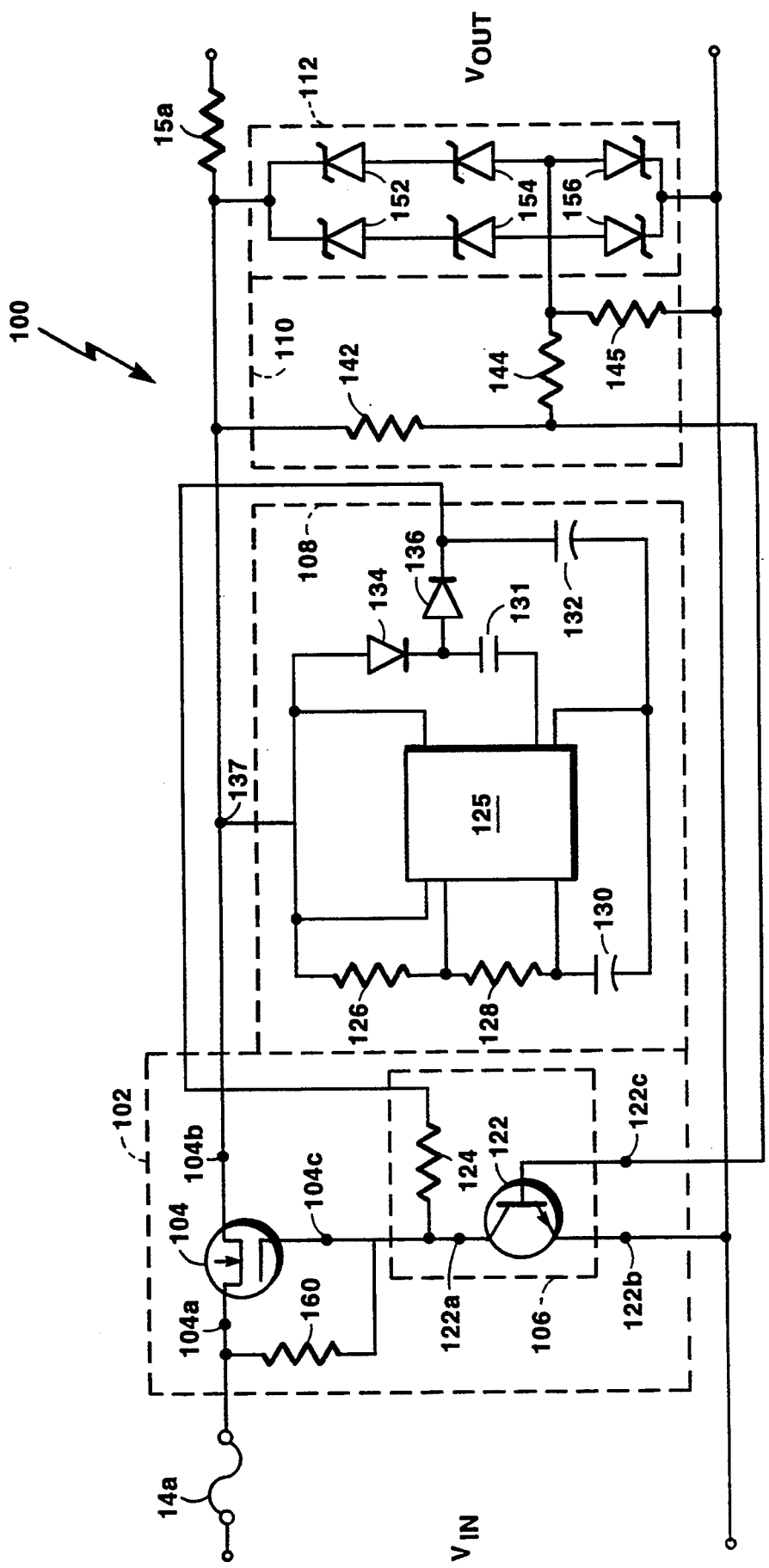

FIG. 3 is an alternative circuit for the non-linear, low-voltage path of FIG. 1; and FIG. 4 is a schematic view of an intrinsically safe power supply in accordance with an alternative embodiment of the invention. C. Detailed Description of the Invention FIG. 1 shows an I.S. DC-to-DC power supply 10 in accordance with an illustrative embodiment of the invention. The I.S. power supply 10 includes a voltage controller 12, e.g., a power operational amplifier ("op amp"). The voltage controller 12 includes a power terminal 12a that is connected via a fuse 14 to a supply voltage, i.e., the input voltage to the supply, $V_{in}$, an inverting input or "control" terminal 12b that is connected to receive a feedback voltage via a feedback arrangement "L", and a non-inverting input terminal 12c that is connected to a reference voltage. The feedback arrangement L dynamically adjusts the voltage controller output voltage (i.e., the voltage on the output. terminal 12d) so as make the difference between the feedback voltage on control terminal 12b and the reference voltage at terminal 12c) equal to essentially zero.

The voltage controller 12 can have any desired differential-voltage gain (i.e., output voltage divided by voltage difference between terminals 12b and 12c), but preferably over 1000, and an input offset voltage of less than 50 millivolts, and thus is readily commercially available and inexpensive.

The I.S. power supply 10 also has an output resistor 15 connected between the output terminal 12d and a power output line 10a of the supply 10. The output resistor 15 limits the maximum current at the power output line 10a to a selected limit. The value of the output resistor 15 is selected to limit the output current to below a safe threshold under even severe overvoltage conditions.

In addition, the I.S. power supply 10 has a Zener barrier 16 including a reverse-biased power Zener diode 18 connected between the output terminal 12d and a node 19 that is connected to the control terminal 12b of the voltage controller 12. The Zener barrier 16 also has a forward-biased power Zener diode 20 connected between the node 19 and ground. The purpose of Zener diode 20 is different from that of diode 18 and will be explained below.

The Zener barrier 16 limits the voltage between the output terminal 12d and ground to a value below a preselected threshold, independent of its polarity. The polarity of that voltage may change or even alternate (i.e., become AC) under fault conditions.

The Zener diode 18 provides the feedback voltage via node 19 to the control terminal 12b. The magnitude of the feedback voltage depends on the value of the reference voltage, as noted above. It is desirable to have the Zener diode 18 operating substantially at its breakdown voltage and with minimal current, so as to maximize the output power from the supply 10 while maintaining a maximum current output below that established by fuse 14. In many applications, the invention delivers 5% to 10% extra power to the load compared to conventional intrinsically safe power supplies.

Figure 2:
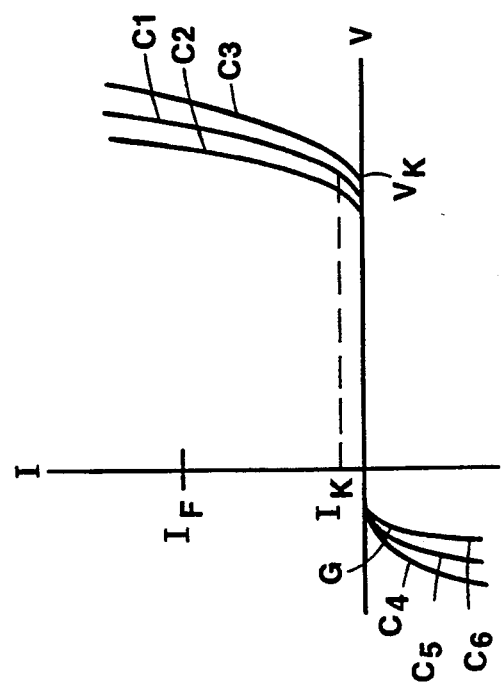
FIG. 2 is a graph depicting the I-V characteristics for a power Zener diode used in the Zener barrier of FIG. 1.

This can best be understood with reference to FIG. 2. There is shown a graph of a set of typical operating current-voltage ("I-V") characteristics for a Zener diode, with current through the diode plotted against the voltage across it. The right-hand side of the graph shows the diode under reverse-bias, and the left-hand side shows it under forward bias.

As can be seen, e.g., for curve C1, when a positive voltage approaching its reverse breakdown voltage is applied, the Zener diode begins to conduct substantial current, i.e., to conduct current at a non-linear rate with respect to increases in reverse voltage. This occurs at a "reverse-bias knee" in the I-V curve C1. As the applied voltage increases above the knee, the current rapidly increases. This reverse-bias knee in the I-V characteristics occurs at the breakdown voltage $V_k$ corresponding to a current $I_k$. The current $I_k$ is substantially less than the rated current of the fuse 14, which is designated $I_F$ on the graph.

By having Zener diode 18 operating substantially at the knee in the curve, that is by having the current flowing through diode 18 approximately equal to $I_k$, the power dissipated by the diode 18 is minimized, and the voltage output from the supply 10 is maximized, while maintaining intrinsically safe operation.

The current flowing through Zener diode 18 is set to $I_k$ by appropriate selection during design of the supply 10 of the value of a bias-setting resistor 22, and of the magnitude of the reference voltage. The resistor 22 provides a linearly resistive path between the node 19, and therefore the input terminal 12b and ground, thereby in parallel with Zener diode 20.

With this arrangement, the current through Zener diode 18 is equal to the reference voltage divided by the resistance of resistor 22, plus a preferably small current flowing through Zener diode 20. Limiting the reference voltage to less than about 0.6 volt will assure that only a small current flows through Zener diode 20, as can be seen on the left side of FIG. 2. Generally speaking, as long as a forward voltage applied to a Zener diode is below about 0.6 volts, the current flowing through it remains below about one milliamp. Since that "forward-bias knee" varies with operating temperature, it is preferred that the reference voltage be maintained below the 0.6-volt knee by a suitable margin, e.g., below about 0.4 volt, to assure such minimal current flow.

The power supply 10 dynamically self-compensates for specification variations in the reverse-breakdown voltage of the Zener diode 18, as well as for temperature drift and aging effects on that voltage during the operational life of the supply. These effects are depicted in FIG. 2, in which curves C1 through C6 correspond to different tolerances or different temperature operating points, etc.; thereby illustrating the variations such effects can have on the Zener currents and voltages and on $V_k$.

With reference again to FIG. 1, as noted above, the feedback loop L (comprising the voltage controller 12, and diode 18, and, though not technically in the loop, we shall discuss the resistor 22 as though part thereof) adjusts the output voltage on terminal 12d so as make the difference between the feedback voltage on control terminal 12b and the reference voltage at terminal 12c equal to zero. This forces the voltage on terminal 12b to equal the reference voltage, regardless of component and operational variations.

With Zener diode 18 part of the feedback loop L, the power supply 10 has resistor 22 connected between the diode 18 and ground. For intrinsically safe operation, however, the path between Zener diode 18 and ground must have substantially zero resistance.

This can be readily understood from an analysis of the power supply 10. The supply's output voltage is equal to the voltage drop across Zener diode 18 plus the product of the current through diode 18 and the resistance of the path to ground.

Under certain fault conditions, the current through the Zener diode 18 rapidly increases with voltage increases above $V_k$ (the voltage at the Zener reverse-bias knee K). Therefore, if the resistance of the path to ground is anything other than substantially zero, the supply's output voltage could attain undesirably high values that exceed intrinsically safe limits prior to the fuse 14 cutting off current to the supply 10.

Accordingly, for intrinsically safe operation, the invention provides a non-linear, low-impedance path 30 from Zener diode 18 to ground. Path 30 is established by Zener diode 20, as alluded to above. The path 30 has, e.g., an impedance of less than about 5 milliohms. Alternatively, a pair of parallel, oppositely-biased power rectifier or Schottky diodes 32, as shown in FIG. 3, on an equivalent arrangement can be substituted for diode 20.

Under fault conditions in which the current through diode 18 reaches as high as, e.g., hundreds of amperes, which it can for a short duration (i.e., until fuse 14 opens), the low impedance of path 30 assures a minimal voltage drop across that path, e.g., of about a couple of volts.

With the incorporation of the Zener barrier within the regulator feedback loop, and the addition of the non-linear, low impedance path 30 to ground, the power supply 10 is self-calibrating, efficient, and intrinsically safe.

D. Alternative Embodiment

FIG. 4 shows an I.S. power supply 100 suitable for use in an overfill protection device (not shown) in accordance with a preferred implementation of the invention. The I.S. power supply 100 includes a "series-pass" type transistor voltage regulator 104, an error amplifier 106, a voltage converter 108, a resistor network 110, and a Zener barrier 112. The regulator 104 is connected between a current-limiting input interface, e.g., fuse 14a, and a current-limiting output interface, e.g., resistor 15a.

The voltage regulator 104 includes an N-channel power MOSFET that receives a DC input voltage Via at an input terminal 104a (i.e., its drain electrode) and produces a substantially constant DC output voltage at an output terminal 104b (i.e., its source electrode) in response to a control voltage at a control terminal 104c (i.e., its gate electrode).

The error amplifier 106 is implemented as a self-referencing, common-emitter NPN bipolar transistor amplifier, although other implementations, such as an operational amplifier ("op amp"), could be substituted. The error amplifier 106 includes a transistor 122 (with a collector electrode 122a, an emitter electrode 122b and a base electrode 122c) and a collector resistor 124.

The voltage converter 108 boosts the voltage from the output terminal 104b of the voltage regulator 104 and supplies the boosted voltage to the control terminal 104c thereof, thereby permitting the regulator control voltage to exceed the regulator output voltage by at least the value of the MOSFET's gate-to-source turn-on voltage.

The voltage converter 108 includes an oscillator 125 (e.g., TLC555 from Texas Instrument, Texas) connected in a conventional charge-pump circuit, which includes resistors 126, 128, capacitors 130–132, and diodes 134, 136. A power input terminal 137 of the voltage converter 108 is connected to the voltage regulator output terminal 104b, so as to supply an input voltage to the voltage converter 108 that is normally more constant than the voltage applied to the regulator input terminal 104a, and is usually independent of the magnitude of the regulator input terminal voltage. By doing so, the particular oscillator 125 used in the circuit can operate with a narrower power supply input range, and thus a less-expensive oscillator can be used.

The resistor network 110 provides a base current limiting impedance for the transistor 122, and a corresponding positive biasing voltage for that transistor to limit conduction through Zener diodes 156 to negligible levels. The resistor network 110 includes resistors 142, 144 and 145.

The Zener barrier 112 includes a network of normally-reversed-biased parallel pairs of Zener diodes 152, 154, and a normally-forward-biased parallel pair of Zener diodes 156. The number of Zener diodes used in a particular application depends the maximum power dissipation by each. The illustrated pair-wise diode arrangement provides component redundancy for intrinsically safe operation, as discussed above. The Zener diodes 156 are analogous to Zener diode 20 in FIG. 1.

A start-up resistor 160 connected between the input and control terminals 104a, 104c of the voltage regulator 104 provides a requisite voltage difference therebetween during start-up of the power supply 100.

Other components can be included in the power supply 100 to optimize its transient response, as will be obvious to those skilled in the art.

During operation of the power supply 100, it is desirable for the error amplifier 106 to operate essentially linearly to produce a controlled output from the voltage regulator 104. To operate linearly, the base-emitter voltage must typically remain at about 0.6 volt, since the transistor 122 becomes saturated above about 0.75 volts and substantially conductive below about 0.4 volt. The base-emitter voltage is obtained by proper selection of resistor 124, and the operation of a regulator feedback loop.

The regulator feedback loop comprises the Zener diodes 152, 154, the resistor network 110, and the error amplifier 122. The error amplifier output controls the regulator output at terminal 104b, which, in turn, via the Zener diodes 152, 154 and the resistor network 110, provides a feedback voltage to the base electrode 122c of transistor 122. The base electrode 122c is thus the analog to the control terminal 12b of FIG. 1. Because the regulator 102 is self-referencing, there is no need for a separately supplied reference voltage.

The feedback voltage on base electrode 122c is maintained at approximately 0.6 volt, which is equal to the regulator output voltage minus the voltage drop across the reverse-biased diodes 152, 154 plus a bias voltage equal to the voltage across resistor 144. Preferably, the value of resistor 142 is much higher than the value of resistor 145, and therefore the bias voltage is approximately equal to the regulator output voltage multiplied by the value of resistor 144 and divided by the value of resistor 142. Accordingly, the voltage across the Zener diodes 156 is under 0.6 volts, thus the current therethrough is minimized. By minimizing the current through the Zener diodes 156, that current becomes negligible compared to the current though the resistor 145. Accordingly, the current through resistor 145 is substantially equal to the current through the Zener diodes 152, 154.

Since the regulator output voltage varies with changes in the voltage drop across the reverse-biased diodes 152, 154, the power supply 100 dynamically self-compensates for any variations in Zener diode operating characteristics that arise, e.g., from zener breakdown-voltage tolerances, temperature drift and aging effects.

Thus, it will be seen that an improved I.S. power supply has been described. The terms and expressions that have been employed herein are terms of description and not of limitation. In the use of such terms and expressions, there is no intention of excluding any equivalents of the features shown and described. It is recognized that various modifications are possible within the scope of the invention claimed.

What is claimed is:

1. An intrinsically safe power supply for providing a controlled supply output voltage relative to a ground both during a normal operation and during a fault condition, comprising:

A) a voltage regulator for producing the controlled supply output voltage at an output terminal thereof in response to an input voltage supplied at an input terminal thereof, the voltage regulator including a feedback loop connected between the output terminal and a control terminal of the voltage regulator, the feedback loop providing a feedback voltage to the control terminal for controlling the magnitude of the controlled supply output voltage;

B) a voltage-clamping Zener barrier connected in said feedback loop of said voltage regulator, said Zener barrier including (1) at least one power Zener diode connected between the voltage regulator output terminal and the control terminal and polarized to be reverse-biased during the normal operation of the power supply, and (2) a non-linear impedance element connected between said control terminal and ground, the non-linear impedance element constructed to have a high impedance during the normal operation and a low impedance during the fault condition; and C) an electrically resistive path connected between the voltage regulator control terminal and the ground.

2. An intrinsically safe power supply in accordance with claim 1, wherein a zener current flows through the at least one Zener diode, and wherein the magnitude of the zener current is dependent upon resistance of the electrically resistive path.

3. An intrinsically safe power supply in accordance with claim 2, wherein the electrically resistive path comprises a resistor and the feedback voltage depends on the magnitude of the zener current.

4. An intrinsically safe power supply in accordance with claim 1, wherein the non-linear impedance element comprises a second Zener diode connected between the regulator control terminal and the ground and polarized to be forward-biased during the normal operation.

5. An intrinsically safe power supply in accordance with claim 1, further comprising an input interface for supplying the input voltage to the regulator input terminal, the input interface including a first current limiter, and an output interface connected to the output terminal for receiving the regulator output voltage and applying the supply output voltage to a load, the output interface including a second current limiter for limiting the supply output current.

6. An intrinsically safe power supply having an output for generating an output voltage with a magnitude and a mechanism for limiting the output voltage in a fault condition, the mechanism including a Zener diode and resistor barrier circuit having a Zener diode connected across the power supply output, the power supply comprising:
a voltage regulator responsive to a feedback signal with a magnitude for producing the output voltage across the Zener diode causing a zener current to flow through the Zener diode, the voltage regulator being constructed so that an increase in the feedback signal magnitude causes the output voltage magnitude to decrease proportionally; and
apparatus responsive to the zener current for generating the feedback signal.

7. An intrinsically safe power supply in accordance with claim 6 wherein the feedback signal generating apparatus comprises apparatus for converting the zener current into a feedback voltage and apparatus for applying the feedback voltage to the voltage regulator as the feedback signal.

8. An intrinsically safe power supply in accordance with claim 7 wherein the converting apparatus comprises a shunt mechanism connected in parallel with the converting apparatus for shunting the zener current away from the converting apparatus in the fault condition.

9. An intrinsically safe power supply in accordance with claim 6 further comprising an unregulated power supply and wherein the Zener diode barrier comprises a fuse connected between the unregulated power supply and the power supply output and the voltage regulator is connected between the fuse and the power supply output.

10. An intrinsically safe power supply having an output for generating an output voltage with a magnitude during a normal condition, the power supply comprising:
a voltage regulator responsive to a feedback signal with a magnitude for producing the output voltage, the voltage regulator being constructed so that an increase in the feedback signal magnitude causes the output voltage magnitude to decrease proportionally;
a first Zener diode connected across the power supply output for limiting the output voltage magnitude in a fault condition, the output voltage being applied across the first Zener diode causing a zener current to flow through the first Zener diode;
a current limiting resistor connected in series between the first Zener diode and the power supply output; and
a current sampling resistor responsive to the zener current for generating the feedback signal.

11. An intrinsically safe power supply in accordance with claim 10 wherein the current sampling resistor is connected in series with the first Zener diode.

12. An intrinsically safe power supply in accordance with claim 10 further comprising a non-linear shunt element connected in parallel with the current sampling resistor, the non-linear shunt element conducting current away from the current sampling resistor in the fault condition.

13. An intrinsically safe power supply in accordance with claim 12 wherein said non-linear shunt element has a high impedance during the normal condition.

14. An intrinsically safe power supply in accordance with claims 12 wherein said non-linear shunt element comprises a second Zener diode connected so that the second Zener diode is forward-biased during the normal condition.

15. An intrinsically safe power supply in accordance with claim 10 further comprising an unregulated power supply and a fuse connecting the unregulated power supply to the voltage regulator.

16. An intrinsically safe power supply in accordance with claim 10 further comprising a source for generating a reference voltage, the source being connected to the voltage regulator, the voltage regulator being constructed to produce the output voltage in response to the difference of the feedback signal and the reference voltage.

* * * * *